C. L. MEES.
BONDING PIN.
APPLICATION FILED MAR. 23, 1918.

1,365,117.

Patented Jan. 11, 1921.

Witness
Frank A. Sable

Inventor
Carl Leo Mees,
By Hood & Schley
Attorneys

UNITED STATES PATENT OFFICE.

CARL LEO MEES, OF TERRE HAUTE, INDIANA.

BONDING-PIN.

1,365,117.　　　　Specification of Letters Patent.　　Patented Jan. 11, 1921.

Application filed March 23, 1918. Serial No. 224.091.

*To all whom it may concern:*

Be it known that I, CARL LEO MEES, a citizen of the United States, residing at Terre Haute, in the county of Vigo and State of Indiana, have invented a new and useful Bonding-Pin, of which the following is a specification.

The object of my invention is to provide a bonding pin of such form that a close and efficient connection may be established thereby between a rail and a bonding wire, without danger of injury to the wire in the bonding operation. In its preferred form, my bonding pin is designed for use in connection with wire of ordinary cross section.

Figure 1:
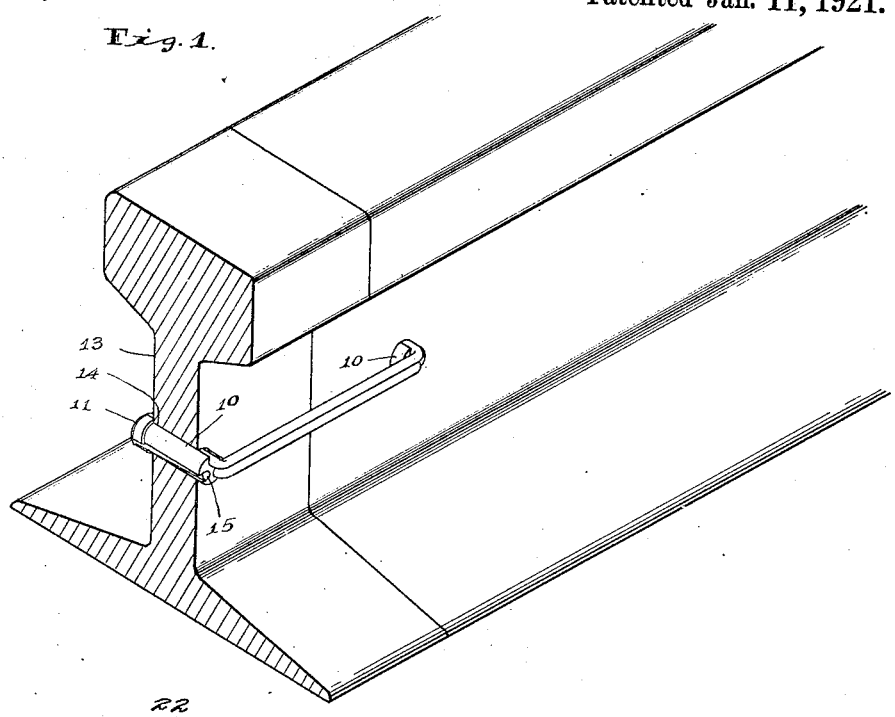
Figure 2:
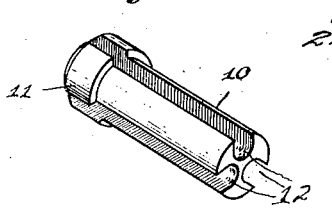
Figure 3:
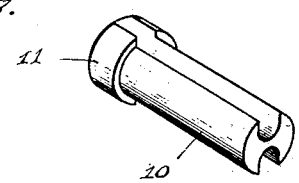
Figure 4:
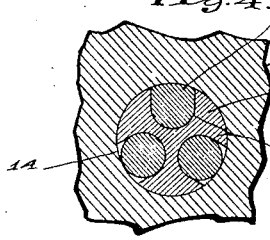
Figure 6:
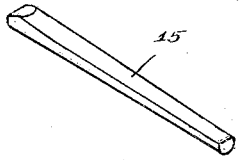
Figure 5:
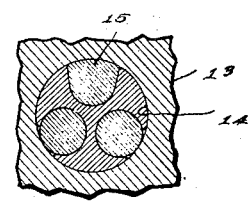

The accompanying drawings illustrate my invention. Figure 1 is a perspective view of a portion of a rail with my improved bonding pin in position and in process of being secured in place; Fig. 2 a perspective view of my improved pin of proper form to receive two bonding wires; Fig. 3 a perspective view of a bonding pin designed for a single wire; Fig. 4 a cross section showing my two-wire pin and associated wires prior to setting; Fig. 5 a similar section after the pin has been set; Fig. 6 a perspective view of a spreading wedge; and Fig. 7 a perspective view of a modified form of pin and associated wedge.

In the drawings, 10 indicates the main body of the pin which is of uniform, or substantially uniform, diameter throughout its length, and at one end is provided with a head, or shoulder, 11. Formed longitudinally in pin 10 and through the head 11, are three grooves 12, which most conveniently will be of uniform character, with a transverse dimension substantially equal to the diameter of the bond wire to be used, and a depth below the surface of the main body 10 equal to the diameter of the bond wire. These grooves are preferably of uniform depth and their bottoms are substantially parallel with the axis of the pin, although this is not absolutely essential.

The web 13 of the rail will be provided with a perforation 14 in the usual manner, this perforation being of just sufficient size to receive readily the shank 10 of the bonding pin.

In the bonding pins now commonly in use, the setting of the pin in the rail is dependent upon a driving tapered fit which requires either a slipping of the pin upon the bond wire or a slipping of both the pin and the bond wire in the perforation of the rail, and it has been found that such an action results many times in a cutting of the wire by the tough skin of the rail at the ends of the perforation. The bonding pins are also similarly cut as they are driven in place.

With my improved pin, the shank of the pin, with the bonding wires inserted, may be readily slipped to place in the perforation of the rail until head 11 engages the rail web. Thereupon, a swaging wedge 15 is inserted in the vacant groove 12 and driven in with considerable force. This wedge serves to spread the adjacent portions of the pin circumferentially within the hole of the rail, not only swaging the pin in the hole so as to firmly bind it in position, but also swaging the pin circumferentially around the wires which lie in the other two grooves 12, thus serving to establish a most intimate contact between the pin, wires and rail. The head 11 prevents any axial movement of the bonding pin during the swaging action and it is, of course, immaterial whether the bonding wires be inserted in the grooves of the pin in the direction of insertion of the pin into the rail, or the opposite direction. In fact, one wire may be inserted in one direction and the other in the opposite direction without in any way interfering with the setting of the bonding pin within the rail and around the bond wires.

It will, of course, be understood that the groove intended to receive the swaging wedge may be specially formed if desired, but if the three grooves are of the same character, the users need not exercise any care in placing the bonding wires in the proper grooves.

It will also be understood that the number of grooves in the bonding pin is immaterial, so long as there be at least two. In the form shown in Fig. 3, a single wire will be placed in one of the grooves of the pin and the pin then swaged circumferentially by driving a suitable wedge into the other groove.

It will also be understood that the swaging wedge may be allowed to remain in position if desired, but this is not necessary, and a single hardened wedge may be used for the setting of many pins.

By forming the pin in such manner that it may be circumferentially swaged without any axial movement between either the pin, rail or bonding wire, all possibility of improper scoring of either the wire or bonding pin is prevented and a bonded joint of long life is thus assured.

It is by no means necessary that the shank of the bonding pin be of uniform diameter, or that the hole in the web be of uniform diameter, because exactly the same results may be obtained by correspondingly tapered pin shank and hole or by a slight tapering of the pin shank to facilitate insertion but to obtain best results, the shank of the pin, when loaded with the bonding wires, should be so proportioned relative to the perforation in the rail that it will slip readily into place with head 11 against the web, without any material cramping.

The head 11 may be omitted, but, in that case, the pin will have to be held by other means against axial movement during the swaging action. It will be readily understood that a very slight swaging or swelling of one end of the pin will serve as a head instead of providing a definitely-formed shoulder, as shown in the drawings.

Figure 7:
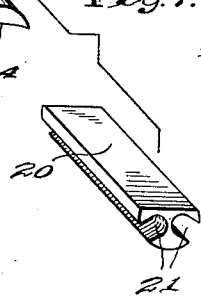

It will also be understood that the pin may be made of a shape which may be readily drawn or rolled, as, for instance, the form shown in Fig. 7, where, instead of a groove for the reception of the swaging ledge, the pin is flattened at one side, as indicated at 20 and the body of the pin provided with one or more grooves 21 for the reception of the bonding wires. Where this form is used, a swage 22 is provided with one surface 23 coöperating with the hole through the web of the rail and another surface 24 which is slightly cupped to engage the surface 20 of the pin and swage its opposite edges toward the wire-receiving grooves.

I claim as my invention:

1. The method of placing bonding pins, which consists in seating, within a perforated body, a bonding pin having a wire-receiving groove, holding said pin and wire against relative axial movement and against axial movement within the perforation, and thereupon circumferentially swaging the pin within its holder and around the wire.

2. The combination with a perforated body of a bonding pin mounted in the perforation of said body and provided with a longitudinal groove, a bonding wire mounted in said groove, and the pin swaged circumferentially within its seat and around the bonding wire without axial movement of pin or wire.

In witness whereof, I have hereunto set my hand at Indianapolis, Indiana, this 18th day of March, A. D. one thousand nine hundred and seventeen.

CARL LEO MEES.